Dec. 16, 1947.    N. H. GOLDSWORTHY    2,432,750
SELF-CLEANING ELECTRODE
Filed Sept. 7, 1945
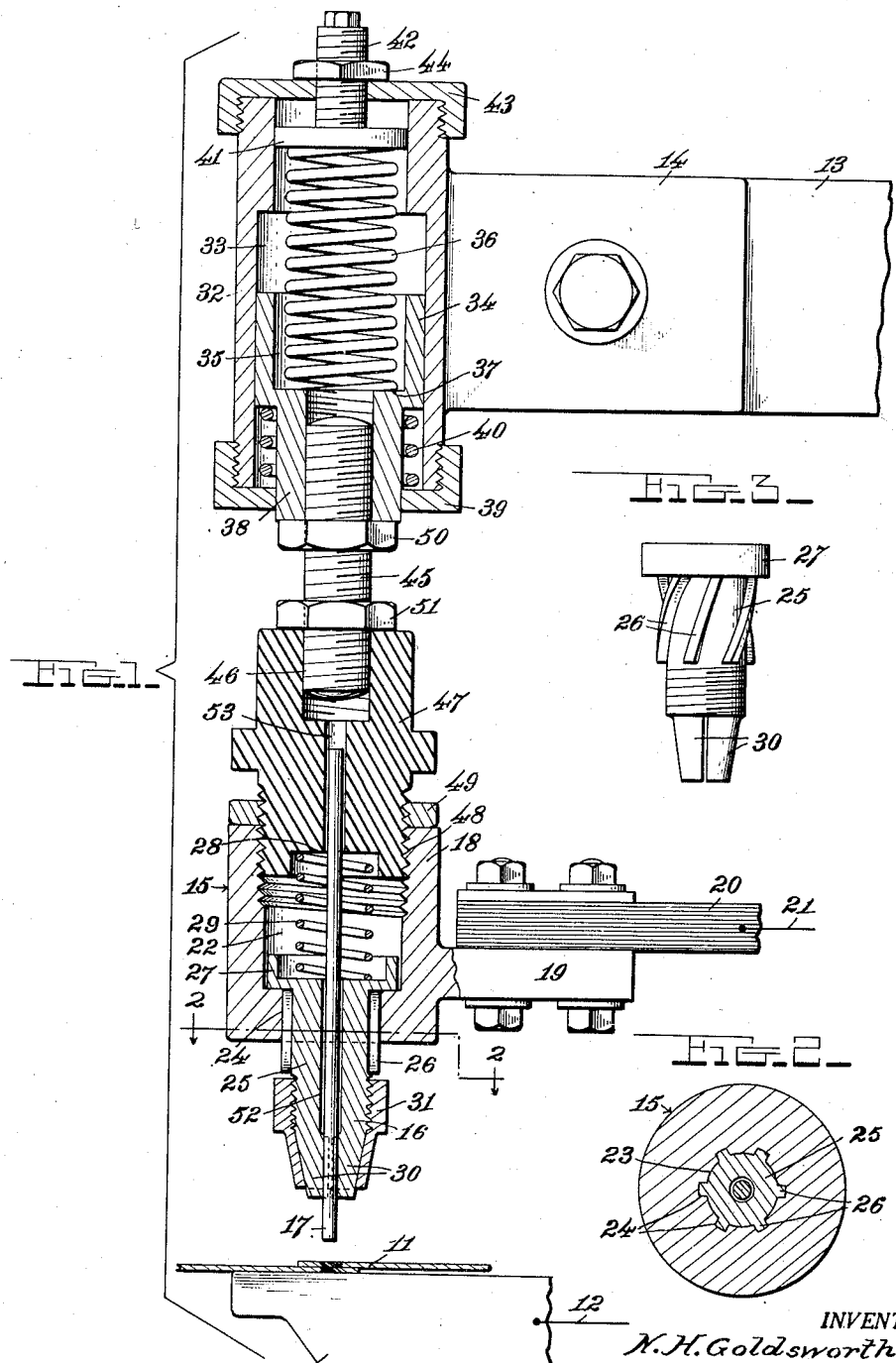
INVENTOR.
N. H. Goldsworthy
BY
Mason, Porter & Diller
ATTYS Patented Dec. 16, 1947

2,432,750

UNITED STATES PATENT OFFICE 2,432,750

SELF-CLEANING ELECTRODE

Norman H. Goldsworthy, New York, N. Y., assignor to Continental Can Company, Inc., New York, N. Y., a corporation of New York Application September 7, 1945, Serial No. 614,993

5 Claims. (Cl. 219—4)

This invention relates to welding and particularly to a self-cleaning electrode for spot welding machines.

While this invention is adaptable to spot welding generally, the assembly herein illustrated and described as embodying the invention, is designed for welding thin materials, and particularly where the welds are made in rapid succession.

One of the chief obstacles found to performing a series of spot welds with rapidity is the difficulty in making sufficient and uniform physical and electrical contacts, due primarily to foreign matter on the work, such as grease, rust, oxidation, or solder flux when used on bodies that have been prepared for soldering. Another obstacle found in conventional welding at high welding speeds has been the mechanical and electrical conditions which prohibit proper conductivity of current to effect a satisfactory weld because of restrictions due to foreign matter on the work, causing skips and incompleted welds, resulting in partially welded parts. Furthermore, with the use of the ordinary electrodes on most coated metals, there is an excessive metal pick-up after each operation and a mushrooming of the electrodes at high speeds and heavy pressures which produce variations in the characteristics of the welding current.

The object of this invention is to provide an electrode assembly whereby the electrode will, upon application to the work, automatically clean the spot to be welded of all foreign matter prior to application of the welding current.

A further object of this invention is to provide an assembly as mentioned which will, after the weld has been made, remove the excess metal pick-up from the electrode before retracting the electrode from the work.

A further object of the invention is to provide a device as mentioned which will not become excessively hot during continued use thereby avoiding the necessity of providing special cooling means.

Other objects will appear hereinafter.

With these objects in view, this invention consists generally in providing an electrode with means for reciprocating the same into and out of pressure contact with the work, and for rotating the electrode while under pressure, and before the welding current is applied, so as to clean the spot to be welded of all foreign matter prior to the weld.

The invention further consists in means for rotating the electrode after the weld has been made and while the same is still engaging the work under pressure, thereby removing any excess of metal pick-up prior to retracting the electrode.

The invention further consists in a device as stated provided with means for regulating the pressure of the electrode on the work.

The invention further consists in a device as mentioned provided with means for absorbing the shocks in high speed welding by preventing over acceleration of the return strokes.

The invention further consists in various details of construction and arrangement of parts, all as will be fully described hereinafter and particularly pointed out in the claims.

The invention will be more readily understood by reference to the accompanying drawings forming a part of this specification and in which Figure 1 is a vertical section through a welding electrode assembly embodying the invention;

Figure 2 is a section on the line 2—2 of Figure 1; and

Figure 3 is a side elevation of the electrode holder.

Referring now to the drawings, 10 indicates a work support or arbor, which also constitutes the stationary electrode of a welding machine upon which the work 11 rests. The arbor 10 is connected to the secondary circuit 12 as shown in Figure 1. Arranged for vertical reciprocation above the arbor 10 is an arm 13 to which is fixed a bracket 14 supporting an electrode assembly which terminates at its lower end in a welding head 15 carrying an electrode holder 16 for the movable electrode 17. The welding head comprises a cylindrical body portion 18 having an arm or bracket 19 to which is connected a flexible copper lead 20 of the secondary circuit 21, and is insulated from the reciprocating arm 13 and bracket 14 in a manner hereinafter described.

With the construction as above described, it is evident that by reciprocation of the arm 13 and the assembly carried thereby, the movable electrode 17 will be brought into contact with the work, the current applied for a predetermined time by means not shown, to make the weld, and then the electrode retracted.

The principal object of this invention is to so actuate the electrode as it passes through the cycle above stated, that it will automatically wipe or clean the surface of the spot to be welded prior to the application of the welding current. To this end the electrode holder partially telescopes within the welding head after the electrode engages the work, and in so doing imparts a rotary movement to the electrode which wipes the spot clean of any foreign matter, thereby forming consistently uniform contacts.

To accomplish this end, the welding head is formed with a bore 22 terminating at its lower end in a reduced bore 23 which is rifled as at 24, and the electrode holder includes a shaft 25 having spiral flanges or fins fitting in said rifling. The upper end of the shaft 25 has a plunger or head 27 arranged within the bore 22, and between said plunger and a stop 28 at the upper end of the bore, to be described more fully hereinafter, is a spring 29. The lower end of the electrode holder is formed with tapered jaws 30 to hold the electrode 17, and a knurled squeeze-nut 31 is threaded on the shaft to clamp the jaws on the electrode.

When the welding head is lowered the electrode point contacts the work and its downward movement is arrested; but continued downward movement of the welding head will, through the medium of the rifled construction above described, rotate the electrode at the same time that increasing pressure is applied thereto by the compression of the spring 29. After the lower end of the welding head 15 comes in contact with the upper end of nut 31, further pressure is applied to ensure a proper contact of the elements to be welded, and a firm engagement of the electrodes with the work.

This further pressure is yieldingly applied through a spring arranged in the upper part of the assembly. To this end the bracket 14 is provided with a cylindrical head 32 having a bore 33 in which is arranged a plunger 34. In the upper end of the plunger is a recess 35 to receive the lower portion of a spring 36, the bottom of said recess constituting a seat 37 for the spring. On the lower end of the plunger 34 is a downwardly extending stem 38 which projects through a removable head 39 on the lower end of the cylinder. Surrounding said stem 38 and interposed between the plunger 34 and the head 39 is a spring 40. The upper end of the spring 36 bears against a disk 41 forming a stop or seat for the same, and said disk is provided with a stem 42 threaded through the upper removable head 43 of the cylinder and having a lock-nut 44. A rigid but adjustable connection is provided between the plunger 34 and the welding head 15, so that the pressure applied to the weld during the welding period is that of the spring 36 plus the lighter spring 29 and this pressure may be readily adjusted by means of the screw 42 as will be readily seen. The spring 40 is provided to cushion the device against excessive vibration by preventing an over acceleration of the head on the up-stroke. The springs 36 and 40 thus cushion the up and down strokes of the arm on the welding head.

Threaded into the stem 38 is a screw 45 the lower end of which is threaded as at 46 into an insulator 47 made of "Marcota" or fiber, and which in turn is threaded as at 48 into the upper end of the welding head. The lower end of this insulator is recessed to form the seat or stop 28 for the spring 29 as hereinbefore mentioned. The insulator 47 is adjustably connected to the welding head by its threaded end 48, and is held in adjusted position by a lock nut 49. The screw 45 being threaded into both the stem 38 of the plunger 34, and into the insulator 47, is thereby adjustably secured to each, and forms an adjustable connection between the said plunger and the welding head, and lock nuts 50 and 51 are provided to maintain the parts in adjusted relation.

With a device of the type described, an electrode of uniformly small diameter is preferably used, and the construction is such that a long electrode may be employed so that frequent renewals are unnecessary, but adjustments may be readily made at the jaws 30 by the knurled nut 31. In order to accommodate an electrode of considerable length, a bore 52 extends axially through the electrode holder, and a bore 53 is provided in the insulator 47 in alignment with the bore 52. By using an electrode of uniformly small diameter, and precleaning the surface at the spot to be welded, the welding will be more rapid, and excessive heating is avoided, so that it is not necessary to provide a special cooling system or other means to prevent over-heating. To assure proper conductivity, the welding head, including the electrode holder, is made from cast copper or copper alloy, but the bracket 14 and associated parts may be made of iron or steel.

From the above description a new method and an apparatus for carrying out the method has been developed which consists in moving an electrode into engagement with a work piece, holding the electrode in pressure engagement with the work piece, and twisting said electrode while under pressure before welding occurs for cleaning the contacting surfaces of the electrode and the work piece, increasing the pressure of the electrode on the work piece after twisting the electrode, energizing the electrode for consummating the weld while the electrode is stationary and under increased pressure, twisting the electrode while under pressure when the welding is completed which will clean the electrode of any excess metal picked up from welding and will to a large extent avoid mushrooming on the end of the electrode and then moving the electrode away from the work to complete the cycle.

It is obvious that many changes in the details of construction of the welding unit and the method performed thereby may be made without departing from the spirit of the invention as set forth in the appended claims.

I claim:

1. In a spot welding machine, a reciprocable bracket, a welding head yieldably supported on said bracket, an electrode and electrode holder, rifle-bearings between said holder and said head for turning the holder when moved relative to the head, yielding means normally projecting said holder outwardly from said head, means for adjusting the tension of said yielding means and means for limiting the movement of the holder into said head.

2. In a spot welding device, a reciprocable bracket having a cylindrical housing, a plunger in said housing, springs arranged on opposite sides of said plunger, a welding head carried by said plunger, an electrode holder, rifle-bearings connecting said welding head and said holder, and a spring normally projecting said holder outwardly of said welding head.

3. In a spot welding machine, a reciprocable bracket having a cylindrical housing, an adjustable bearing in the outer end of said housing, a plunger in said housing, a spring arranged between said plunger and said bearing, a spring between said plunger and the inner end of said housing, a welding head, an electrode holder, a rifle-connection between said welding head and said electrode holder for turning the holder when moved relative to the head, yielding means normally projecting said holder outwardly of said welding head and means for limiting the movement of the holder into said head.

4. In a spot welding device, a reciprocable bracket having a cylindrical housing, a plunger in said housing, springs arranged between said plunger and the ends of said housing, an insulating member, a threaded stem rigidly connecting said plunger and said insulating member, a welding head secured on said insulating member, an electrode holder carried by said head and adapted to partially telescope therein, means for normally projecting said holder outwardly, and means for turning said holder on its axis as it moves relative to said head.

5. In a spot welder, a reciprocable bracket having a cylindrical housing, a plunger in said housing, springs arranged between said plunger and the ends of said housing, an insulating member, a threaded stem rigidly and adjustably connecting said plunger and said insulating member, a welding head secured on said insulating member, an electrode holder carried by said head and adapted to partially telescope therein, means for normally projecting said holder outwardly, means for turning said holder on its axis as it moves relative to said head and means for limiting the movement of the holder into the head.

NORMAN H. GOLDSWORTHY.

REFERENCES CITED

The following references are of record in the file of this patent:

UNITED STATES PATENTS

| Number | Name | Date |
|---|---|---|
| 1,242,171 | Geisenhoner | Oct. 9, 1917 |
| 1,536,838 | Geisenhoner | May 5, 1925 |